United States Patent
Onetto et al.

(10) Patent No.: US 10,712,717 B2
(45) Date of Patent: Jul. 14, 2020

(54) CONDITION-BASED VALIDATION OF PERFORMANCE UPDATES

(71) Applicant: General Electric Company, Schenectady, NY (US)

(72) Inventors: Raimundo Onetto, San Ramon, CA (US); Peter Alan Gregg, Schenectady, NY (US); Jeff Eric Bergman, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 15/772,548

(22) PCT Filed: Nov. 17, 2015

(86) PCT No.: PCT/US2015/061013
§ 371 (c)(1),
(2) Date: May 1, 2018

(87) PCT Pub. No.: WO2016/186694
PCT Pub. Date: Nov. 24, 2016

(65) Prior Publication Data
US 2018/0364651 A1    Dec. 20, 2018

Related U.S. Application Data

(60) Provisional application No. 62/162,547, filed on May 15, 2015.

(51) Int. Cl.
*G05B 13/02*    (2006.01)
*F03D 7/04*    (2006.01)
(Continued)

(52) U.S. Cl.
CPC ......... *G05B 13/021* (2013.01); *F01D 21/003* (2013.01); *F01D 21/14* (2013.01);
(Continued)

(58) Field of Classification Search
None
See application file for complete search history.

(56) References Cited

U.S. PATENT DOCUMENTS 6,925,385 B2    8/2005    Ghosh et al.
7,346,469 B2    3/2008    Taware et al.
(Continued)

FOREIGN PATENT DOCUMENTS

WO    2015/077337 A1    5/2015

OTHER PUBLICATIONS

Löhn, A., and Hitzmann, B., "A Knowledge-Based System for Real-Time Validation of Calibrations and Measurements," Chemometrics and Intelligent Laboratory Systems, vol. 46, pp. 57-66, (1999).

(Continued)

*Primary Examiner* — Ryan A Jarrett
(74) *Attorney, Agent, or Firm* — Dority & Manning, P.A.

(57) ABSTRACT

Systems and methods for condition-based validation of performance updates are provided. According to one embodiment of the disclosure, a method can include operating an asset under updated settings, ascertaining ambient conditions of the asset and matching the ambient conditions to a condition range, determining whether data completion criteria for the condition range are satisfied and, based at least in part on the determination, selectively switching between using the updated settings for operating the asset and using baseline settings for operating the asset while collecting data points for a predetermined period of time.

18 Claims, 9 Drawing Sheets

(51) Int. Cl.
  *G06F 17/40* (2006.01)
  *G06Q 50/06* (2012.01)
  *H02J 3/38* (2006.01)
  *F03D 17/00* (2016.01)
  *F01D 21/00* (2006.01)
  *F01D 21/14* (2006.01)

(52) U.S. Cl.
  CPC ............ *F03D 7/042* (2013.01); *F03D 7/046* (2013.01); *F03D 7/047* (2013.01); *F03D 7/048* (2013.01); *F03D 17/00* (2016.05); *G06F 17/40* (2013.01); *G06Q 50/06* (2013.01); *H02J 3/386* (2013.01); *F05B 2230/80* (2013.01); *F05B 2270/32* (2013.01); *F05B 2270/321* (2013.01); *F05B 2270/323* (2013.01); *F05B 2270/324* (2013.01); *F05B 2270/325* (2013.01); *F05B 2270/504* (2013.01); *F05D 2270/311* (2013.01); *F05D 2270/312* (2013.01); *F05D 2270/313* (2013.01); *F05D 2270/54* (2013.01); *Y02E 10/723* (2013.01); *Y02E 10/763* (2013.01); *Y02E 40/76* (2013.01); *Y04S 10/545* (2013.01)

(56) References Cited

U.S. PATENT DOCUMENTS

| | | | |
|---|---|---|---|
| 7,509,185 B2 | 3/2009 | Popp | |
| 8,155,923 B2 | 4/2012 | Mengane et al. | |
| 8,295,987 B2 | 10/2012 | Gadre et al. | |
| 9,995,278 B2 | 6/2018 | Lund et al. | |
| 2004/0197186 A1 | 10/2004 | Wobben | |
| 2005/0203697 A1 | 9/2005 | Dalgleish | |
| 2011/0213526 A1* | 9/2011 | Giles | G07C 5/085 701/33.4 |
| 2011/0224926 A1 | 9/2011 | Morjaria et al. | |
| 2013/0073223 A1* | 3/2013 | Lapira | G06F 19/00 702/34 |
| 2013/0166082 A1 | 6/2013 | Ambekar et al. | |
| 2013/0173168 A1 | 7/2013 | Abitrabi et al. | |
| 2013/0191076 A1 | 7/2013 | Jiang et al. | |
| 2016/0123307 A1* | 5/2016 | Drack | G01P 3/80 73/112.01 |
| 2016/0245263 A1* | 8/2016 | Ikeda | F03D 17/00 |
| 2016/0365735 A1 | 12/2016 | Raczynski et al. | |

OTHER PUBLICATIONS

Sasaki, S., et al., "Serum Biomarker-based Validation of a Self-administered Diet History Questionnaire for Japanese Subjects," Journal of Nutritional Science and Vitaminology, vol. 46, pp. 285-296, (2000).

International Search Report and Written Opinion issued in connection with corresponding PCT Application No. PCT/US2015/061013 dated Feb. 8, 2016.

Mochel, K. L., et al., System and method to control power systems, GE Co-Pending U.S. Appl. No. 62/162,547, filed May 15, 2015.

\* cited by examiner

| Baseline Condition | Air Density | | | | | | |
|---|---|---|---|---|---|---|---|
| Wind Speed | 1 | 1,04 | 1,08 | 1,12 | 1,16 | 1,2 | 1,24 |
| 0 | | | | | | | |
| 0,5 | | | | | | | |
| 1 | | | | | | | |
| 1,5 | | | | | | | |
| 2 | | | | | | | |
| 2,5 | | | | | | | |
| 3 | | | | | | | |
| 3,5 | | | | | | | |
| 4 | | | | | | | |
| 4,5 | | | | | | | |
| 5 | | | | | | | |
| 5,5 | | | | | | | |
| 6 | | | | | | | |
| 6,5 | | | 4h | | | | |
| 7 | | | | | | | |
| 7,5 | | | | | | | |
| 8 | | | | | | | |
| 8,5 | | | | | | | |
| 9 | | | 4h | | | | |
| 9,5 | | | | | | | |
| 10 | | | | | | | |
| 10,5 | | | | | | | |
| 11 | | | | | | | |
| 11,5 | | | | | | | |
| 12 | | | | | | | |
| 12,5 | | | | | | | |
| 13 | | | | | | | |
| 13,5 | | | | | | | |
| 14 | | | | | | | |
| 14,5 | | | | | | | |
| 15 | | | | | | | |

FIG. 5

| Updated Condition | Air Density | | | | | | |
|---|---|---|---|---|---|---|---|
| Wind Speed | 1 | 1,04 | 1,08 | 1,12 | 1,16 | 1,2 | 1,24 |
| 0 | | | | | | | |
| 0,5 | | | | | | | |
| 1 | | | | | | | |
| 1,5 | | | | | | | |
| 2 | | | | | | | |
| 2,5 | | | | | | | |
| 3 | | | | | | | |
| 3,5 | | | | | | | |
| 4 | | | | | | | |
| 4,5 | | | | | | | |
| 5 | | | | | | | |
| 5,5 | | | | | | | |
| 6 | | | | | | | |
| 6,5 | | | 3h | | | | |
| 7 | | | | | | | |
| 7,5 | | | | | | | |
| 8 | | | | | | | |
| 8,5 | | | | | | | |
| 9 | | | 4h | | | | |
| 9,5 | | | | | | | |
| 10 | | | | | | | |
| 10,5 | | | | | | | |
| 11 | | | | | | | |
| 11,5 | | | | | | | |
| 12 | | | | | | | |
| 12,5 | | | | | | | |
| 13 | | | | | | | |
| 13,5 | | | | | | | |
| 14 | | | | | | | |
| 14,5 | | | | | | | |
| 15 | | | | | | | |

FIG. 6

| Wind Speed | Air Density | | | | | |
|---|---|---|---|---|---|---|
| | 1 | 1,04 | 1,08 | 1,12 | 1,16 | 1,2 | 1,24 |
| 0 | 50 | 50 | 50 | 50 | 50 | 50 | |
| 0,5 | 50 | 50 | 50 | 50 | 50 | 50 | |
| 1 | 50 | 50 | 50 | 50 | 50 | 50 | |
| 1,5 | 50 | 50 | 50 | 50 | 50 | 50 | |
| 2 | 50 | 50 | 50 | 50 | 50 | 50 | |
| 2,5 | 150 | 150 | 150 | 150 | 150 | 150 | |
| 3 | 150 | 150 | 150 | 150 | 150 | 150 | |
| 3,5 | 150 | 150 | 150 | 150 | 150 | 150 | |
| 4 | 150 | 150 | 150 | 150 | 150 | 150 | |
| 4,5 | 150 | 150 | 150 | 150 | 150 | 150 | |
| 5 | 150 | 150 | 150 | 150 | 150 | 150 | |
| 5,5 | 150 | 150 | 150 | 150 | 150 | 150 | |
| 6 | 150 | 150 | 150 | 150 | 150 | 150 | |
| 6,5 | 150 | 150 | 150 | 150 | 150 | 150 | |
| 7 | 150 | 150 | 150 | 150 | 150 | 150 | |
| 7,5 | 150 | 150 | 150 | 150 | 150 | 150 | |
| 8 | 150 | 150 | 150 | 150 | 150 | 150 | |
| 8,5 | 150 | 150 | 150 | 150 | 150 | 150 | |
| 9 | 150 | 150 | 150 | 150 | 150 | 150 | |
| 9,5 | 150 | 150 | 150 | 150 | 150 | 150 | |
| 10 | 150 | 150 | 150 | 150 | 150 | 150 | |
| 10,5 | 150 | 150 | 150 | 150 | 150 | 150 | |
| 11 | 150 | 150 | 150 | 150 | 150 | 150 | |
| 11,5 | 150 | 150 | 150 | 150 | 150 | 150 | |
| 12 | 20 | 20 | 20 | 20 | 20 | 20 | |
| 12,5 | 20 | 20 | 20 | 20 | 20 | 20 | |
| 13 | 20 | 20 | 20 | 20 | 20 | 20 | |
| 13,5 | 20 | 20 | 20 | 20 | 20 | 20 | |
| 14 | 20 | 20 | 20 | 20 | 20 | 20 | |
| 14,5 | 20 | 20 | 20 | 20 | 20 | 20 | |
| 15 | 20 | 20 | 20 | 20 | 20 | 20 | |
| 15.5 | 20 | 20 | 20 | 20 | 20 | 20 | |
| 16.0 | 20 | 20 | 20 | 20 | 20 | 20 | |
| 16.5 | | | | | | | |

FIG. 7

| Expected Frequency | Air Density | | | | | | |
|---|---|---|---|---|---|---|---|
| Wind Speed | 1 | 1,04 | 1,08 | 1,12 | 1,16 | 1,2 | 1,24 |
| 0 | 0,0 | 0,3 | 1,8 | 2,5 | 0,6 | 0 | 0,0 |
| 0,5 | 0,0 | 0,3 | 1,0 | 1,1 | 0,2 | 0,5 | 0,0 |
| 1 | 0,0 | 1,1 | 2,1 | 1,9 | 0,3 | 1 | 0,0 |
| 1,5 | 0,0 | 6,5 | 13,4 | 11,0 | 2,1 | 1,5 | 0,0 |
| 2 | 0,6 | 32,2 | 66,4 | 51,5 | 10,5 | 2 | 0,0 |
| 2,5 | 0,7 | 36,9 | 61,6 | 57,0 | 11,7 | 2,5 | 0,0 |
| 3 | 0,0 | 10,0 | 22,3 | 18,3 | 17,5 | 3 | 0,0 |
| 3,5 | 0,1 | 35,7 | 57,7 | 35,4 | 19,6 | 3,5 | 0,0 |
| 4 | 0,3 | 79,1 | 95,2 | 49,1 | 23,6 | 4 | 0,0 |
| 4,5 | 0,4 | 130,6 | 125,4 | 59,5 | 30,0 | 4,5 | 0,0 |
| 5 | 0,2 | 189,2 | 189,2 | 70,7 | 32,9 | 5 | 0,0 |
| 5,5 | 0,1 | 235,1 | 237,0 | 80,3 | 33,4 | 5,5 | 0,0 |
| 6 | 0,0 | 254,3 | 273,8 | 89,2 | 30,8 | 6 | 0,1 |
| 6,5 | 0,0 | 242,1 | 295,9 | 101,4 | 26,6 | 6,5 | 0,3 |
| 7 | 0,0 | 215,0 | 298,0 | 113,8 | 22,8 | 7 | 0,3 |
| 7,5 | 0,0 | 185,7 | 277,2 | 119,9 | 19,8 | 7,5 | 0,3 |
| 8 | 0,0 | 154,4 | 258,1 | 123,5 | 19,3 | 8 | 0,2 |
| 8,5 | 0,0 | 138,8 | 252,7 | 125,0 | 20,5 | 8,5 | 0,0 |
| 9 | 0,0 | 109,6 | 251,2 | 124,0 | 20,1 | 9 | 0,0 |
| 9,5 | 0,0 | 95,2 | 246,4 | 120,9 | 17,4 | 9,5 | 0,0 |
| 10 | 0,0 | 83,1 | 241,0 | 117,7 | 13,1 | 10 | 0,0 |
| 10,5 | 0,0 | 74,3 | 215,2 | 108,8 | 9,2 | 10,5 | 0,0 |
| 11 | 0,0 | 60,4 | 170,2 | 94,3 | 6,3 | 11 | 0,0 |
| 11,5 | 0,0 | 42,7 | 119,2 | 75,1 | 4,4 | 11,5 | 0,0 |
| 12 | 0,0 | 25,0 | 77,0 | 54,4 | 3,3 | 12 | 0,0 |
| 12,5 | 0,0 | 12,5 | 48,9 | 35,2 | 2,1 | 12,5 | 0,0 |
| 13 | 0,0 | 5,6 | 31,0 | 22,9 | 1,2 | 13 | 0,0 |
| 13,5 | 0,0 | 2,5 | 19,6 | 14,1 | 0,9 | 13,5 | 0,0 |
| 14 | 0,0 | 1,0 | 11,9 | 9,0 | 0,8 | 14 | 0,0 |
| 14,5 | 0,0 | 0,3 | 7,3 | 5,6 | 0,8 | 14,5 | 0,0 |
| 15 | 0,0 | 0,1 | 4,6 | 4,0 | 1,1 | 15 | 0,0 |

CONDITION-BASED VALIDATION OF PERFORMANCE UPDATES

TECHNICAL FIELD

This disclosure relates generally to data processing and, more particularly, to condition-based validation of performance updates.

BACKGROUND

Performance of an asset, for example, a wind turbine, can depend, to a high degree, on software by which it is being controlled. New software or a software update can be used to improve performance of assets. However, installing new software or a software update can produce varying performance results depending on ambient conditions, asset model, location, and other factors. Thus, in some cases, an update can result in a significant increase in production while, in other cases, an update can result in no significant impact. Accurate calculation of the performance increase can be of importance, for example, when update pricing models are outcome-based. For, example, the price of the update can be proportional to the delivered benefit. To analyze effects of an update on performance, performance validations can be carried out.

One approach to performance validation includes comparing operational data of an asset under updated software to historical operational data used as baseline data. Operational data for the updated software can be collected for a certain period (for example, two weeks) and compared to the baseline data. However, because ambient conditions for the two sets of data can vary significantly (due to comparing data collected during different time periods), no meaningful comparison can be possible. For example, a rain can increase performance of a wind turbine due to the rain cleaning the blades of the wind turbine. Thus, the validation results can be uncertain. Additionally, this approach can involve a significant manual effort.

Another approach to performance validation includes toggling between updated and baseline software (a previous version of software) for a period of time. By toggling the asset back and forth between the two sets of settings, performance analysis can be conducted for two sets of data collected under similar ambient conditions. The toggling can be performed at predetermined times, for example every 20 minutes. This approach allows reducing influence of changes in ambient conditions on validation results. However, data collected during a period of time (for example, two weeks) may not represent all-year operation of the asset. Ambient conditions can vary significantly with a season change. Conducting performance validations during the entire year can resolve this issue, but will potentially result in losing half of the benefit of the update.

BRIEF DESCRIPTION OF THE DISCLOSURE

The disclosure relates to systems and methods for condition-based validation of performance updates. According to one embodiment of the disclosure, a system is provided. The system can include a processor and a database communicatively coupled to the processor. The processor can be configured to operate an asset under updated settings. The asset can include a turbine or a wind turbine. The processor can be further configured to ascertain ambient conditions of the asset and match the ambient conditions to a condition range. The processor can determine whether data completion criteria for the condition range are satisfied. The data completion criteria can include a predetermined minimum number of data points for the condition range and performing statistical analysis on the data points.

Furthermore, the data completion criteria can be calculated by assigning a weight to the condition range based at least in part on a frequency distribution of the condition range. The processor can determine that the data completion criteria are satisfied if a threshold percentage of all condition ranges is reached. Based at least in part on the determination, the processor can selectively switch between using the updated settings for operating the asset and using baseline settings for operating the asset while collecting data points for a predetermined period of time. The database can be configured to store the data points for the condition range.

Moreover, the processor can be configured to compare the power output of the asset under the baseline settings and the updated settings and validate the performance updates based at least in part on the comparison. Additionally, the system can include at least one sensor configured to sense at least one parameter, such as, for example, a power output, associated with the data points for the predetermined period of time.

In another embodiment of the disclosure, a method is provided. The method can include operating an asset under updated settings by a processor. The method can also include ascertaining ambient conditions of the asset. The ambient conditions include a wind speed, a wind direction, a wind shear, an air density, an air temperature, an air humidity, an air pressure, a Bulk Richardson Number, a turbulence intensity, a wind veer, a time of day, a season, and other metric quantifying Atmospheric Stability. The method can then proceed with matching the ambient conditions to a condition range and determining whether data completion criteria for the condition range are satisfied. The data completion criteria can include a predetermined minimum number of data points for the condition range, performing statistical analysis on the data points, and so forth. Within the statistical analysis, partial data for a subset of the data points can be collected and an average and a deviation of the partial data determined.

Furthermore, it can be determined whether an uncertainty derived by dividing the deviation by a square root of the predefined minimum number of data points exceeds a predetermined uncertainty threshold. Additionally, the data completion criteria for the condition range can be calculated by assigning a weight to the condition range based at least in part on a frequency distribution of the condition range. The method can also include selectively switching between using the updated settings for operating the asset and using baseline settings for operating the asset while collecting data points for a predetermined period of time. Additionally, the method can include determining that the data completion criteria for the condition range are satisfied and, based at least in part on the determination, validate performance improvements for the condition range based. The validating can include comparing power output of the asset under the baseline settings and the updated settings.

In yet another embodiment of the disclosure, a power generation system is provided. The power generation system can include a turbine, a controller in communication with the turbine, a processor in communication with the controller, and a database in communication with the processor. The controller can include at least one performance update including at least one updated setting. The processor can be configured to operate the turbine under the at least one updated setting, ascertain ambient conditions of the turbine, and match the ambient conditions to a condition range. Furthermore, the processor can be configured to determine whether data completion criteria for the condition range are satisfied. Based at least in part on the determination, the processor can selectively switch between using the updated settings for operating the asset and using baseline settings for operating the asset while collecting data points for a predetermined period of time. When the processor determines that the data completion criteria for the condition range are satisfied, the processor can validate performance improvements for the condition range. The database can be configured to store the data points for the condition range.

Other embodiments and aspects of the disclosure will become apparent from the following description taken in conjunction with the following drawings.

DETAILED DESCRIPTION

The following detailed description includes references to the accompanying drawings, which form part of the detailed description. The drawings depict illustrations, in accordance with example embodiments of the disclosure. These example embodiments of the disclosure, which are also referred to herein as "examples," are described in enough detail to enable those skilled in the art to practice the present subject matter. The example embodiments may be combined, other embodiments may be utilized, or structural, logical, and electrical changes can be made, without departing from the scope of the claimed subject matter. The following detailed description is, therefore, not to be taken in a limiting sense, and the scope is defined by the appended claims and their equivalents.

Certain embodiments of the disclosure described herein relate to methods and systems for condition-based validation of performance updates. Specifically, a system for a condition-based validation of performance updates can enable an accurate and reliable determination of a performance change due to an update of operational settings and/or controlling software of an asset. The asset can be operated under the updated settings with periodical toggling back to baseline settings (settings of the asset before the update) to collect data indicative of the asset performance. After the asset is run for a period of time under updated settings, the collected operating data can be compared to baseline data collected under similar ambient conditions in the past.

Thus, instead of having to toggle between updated and baseline settings, the comparison is made between condition ranges defined in a data matrix. The ambient conditions of a historical period are matched to a condition range in the data matrix. A system for condition-based validation of performance updates can determine whether data collection for the condition range is completed. Completion of the data collection can be determined based at least in part on data completion criteria which can be defined prior to the performance validation. If the data collection is not completed, the system for condition-based validation of performance updates can toggle the asset to the baseline settings for the predefined period, and then back to the updated settings for the same period. After the predefined period under the updated settings, the ambient conditions can be analyzed again. The ambient conditions can include a wind speed, a wind direction, a wind shear, an air density, an air temperature, an air humidity, an air pressure, a Bulk Richardson Number, a turbulence intensity, a wind veer, a time of day, a season, and other metric quantifying Atmospheric Stability. If the data collection for a certain condition range is completed, toggling to the baseline settings is no longer performed for the predefined period and the asset is operated under the updated settings. After the predefined period, a similar procedure can be performed and a decision as to whether to toggle to the baseline settings is made. Thus, the system for condition-based validation of performance updates can provide for increased time of operation under the updated settings in order to improve or otherwise optimize the benefit of the updated settings during the performance validation.

Determining whether the data collection for a certain condition range in a data matrix is completed can be based at least in part on data completion criteria. The data completion criteria can include a minimum number of data points for a certain condition range (e.g., wind speed and density). The collected data points can be analyzed statistically to determine whether the uncertainty for the condition range is below a predetermined uncertainty threshold. If it is determined that the uncertainty is under the predetermined uncertainty threshold, collection of data for that condition range can stop. Furthermore, the data completion criteria for the condition range can include a frequency distribution of the condition range. The frequency distribution can represents a number of days or hours expected for each point in the data matrix during a typical year. According to the frequency distribution, the system for condition-based validation of performance updates can assign a weight to the condition range. The weight of the condition range can be one of the data completion criteria.

The technical effects of certain embodiments of the disclosure can include improving performance of an asset during a performance validation and decreasing the time period of the performance validation. Further technical effects of certain embodiments of the disclosure can include providing improved calculations of the performance resulting from an asset settings update.

Figure 1:
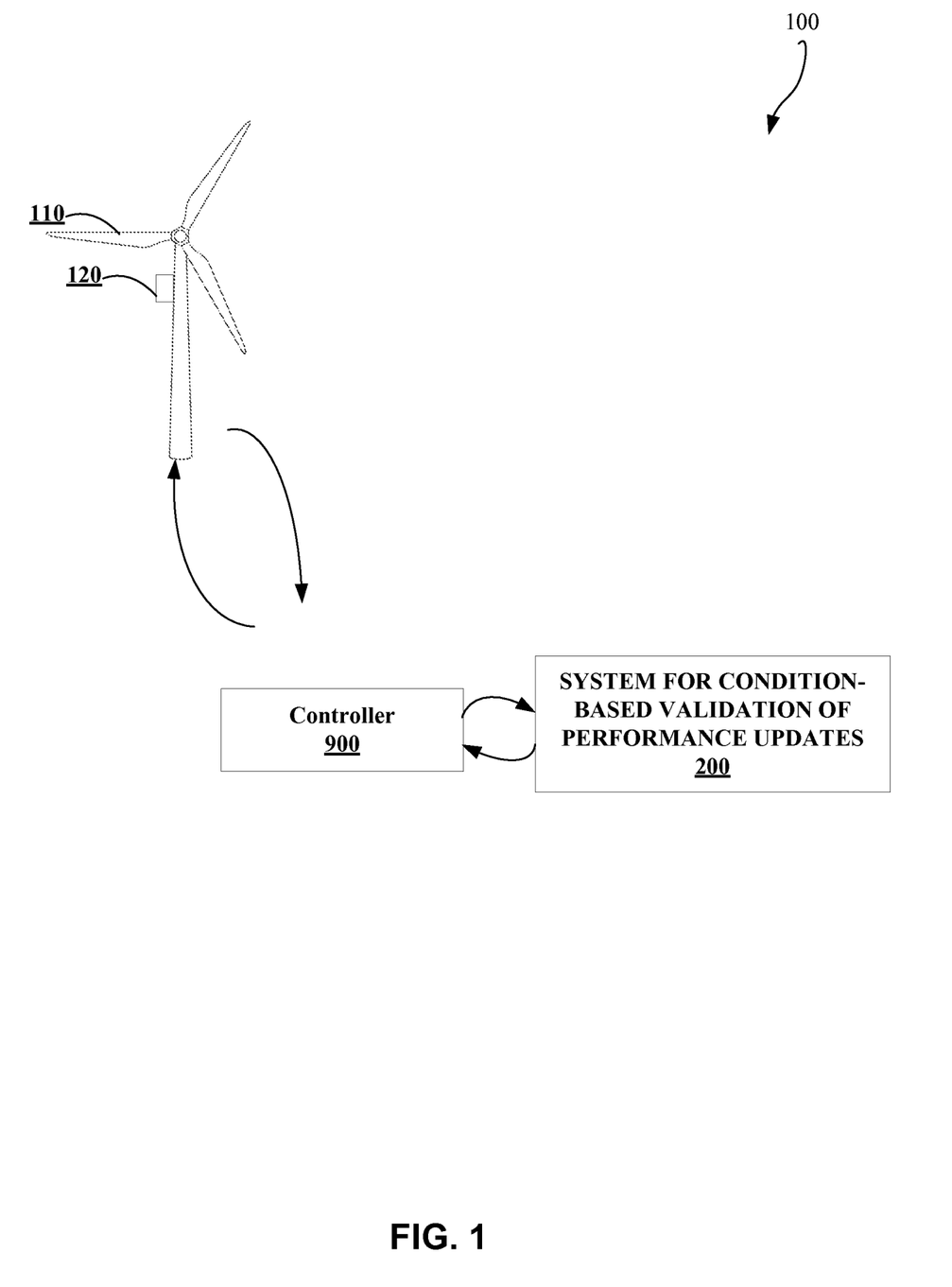
FIG. 1 is a block diagram illustrating an example environment suitable for implementing systems and methods for condition-based validation of performance updates, in accordance with certain embodiments of the disclosure.

The following provides the detailed description of various example embodiments of the disclosure related to systems and methods for condition-based validation of performance updates. Referring now to FIG. 1, a block diagram illustrates an example system environment 100 suitable for implementing systems and methods for condition-based validation of performance updates, in accordance with one or more example embodiments of the disclosure. The environment can include a wind turbine 110, a sensor 120, a controller 900, and a system 200 for condition-based validation of performance updates. The wind turbine 110 is an example asset used for description purposes, however, one will recognize that the systems and methods for condition-based validation of performance updates can be applied to any other assets.

The sensor 120 may be installed on the wind turbine 110 and sense one or more of parameters indicative of performance of the wind turbine 110. In some example embodiments of the disclosure, the parameters can include a power output, a voltage stability, a rotational speed of the turbine, and so forth.

The wind turbine 110 can be coupled to the controller 900, which can be operable to control operations of the wind turbine 110. The controller 900 can include a computer system having a processor(s) that executes programs to control the operations of the wind turbine 110 using sensor inputs, transfer function outputs, and instructions from human operators. Programs to control the operations of the wind turbine 110 and settings related to the wind turbine 110 can be periodically updated, upgraded, or otherwise modified to improve performance of the wind turbine 110. The system 200 for condition-based validation of performance updates can carry out the validation of the performance and calculate the percentage by which the performance may be improved responsive to the update.

The controller 900 can interact with the system 200 for condition-based validation of performance updates to obtain data concerning parameters sensed by the sensor 120 and/or ambient conditions present in proximity of the wind turbine 110. Alternatively, the system 200 for condition-based validation of performance updates can receive or ascertain ambient conditions from other external or internal sources. The ambient conditions can include a wind speed, a wind direction, a wind shear, an air density, an air temperature, an air humidity, an air pressure, a Bulk Richardson Number, a turbulence intensity, a wind veer, a time of day, a season, and other metric quantifying Atmospheric Stability. In some embodiments, the system 200 for condition-based validation of performance updates can reside in the controller 900. Alternatively, the system 200 can be an independent entity communicatively coupled to the controller 900.

The system 200 for condition-based validation of performance updates either alone or in cooperation with the controller 900 can control the wind turbine 110 to operate interchangeably under baseline settings present before the update associated with the wind turbine 110 or updated settings specified as a result of the update. Periods of time under baseline settings and updated settings can be substantially equal ten minutes increments, for example, 10 minutes, 20 minutes, 30 minutes, and so forth. Data indicative of performance of the wind turbine 110 can be collected and stored for the baseline and updated settings and associated with the ambient conditions. The collected data can represent performance of the wind turbine 110 under the baseline and updated settings for expected combinations of conditions (e.g., wind speed and density) in a data matrix. When data for a certain condition range (e.g., wind speed of about 6 meters per second and air density of about 1.2 kilogram per cubic meter) is considered completed, the system 200 for condition-based validation of performance updates can stop toggling the wind turbine 110 to the baseline settings for the condition range. The wind turbine 110 can continue operating under the updated settings and determine, for each of the remaining predefined periods, whether the data completion criteria are satisfied for the condition range corresponding to the present ambient conditions.

Figure 2:
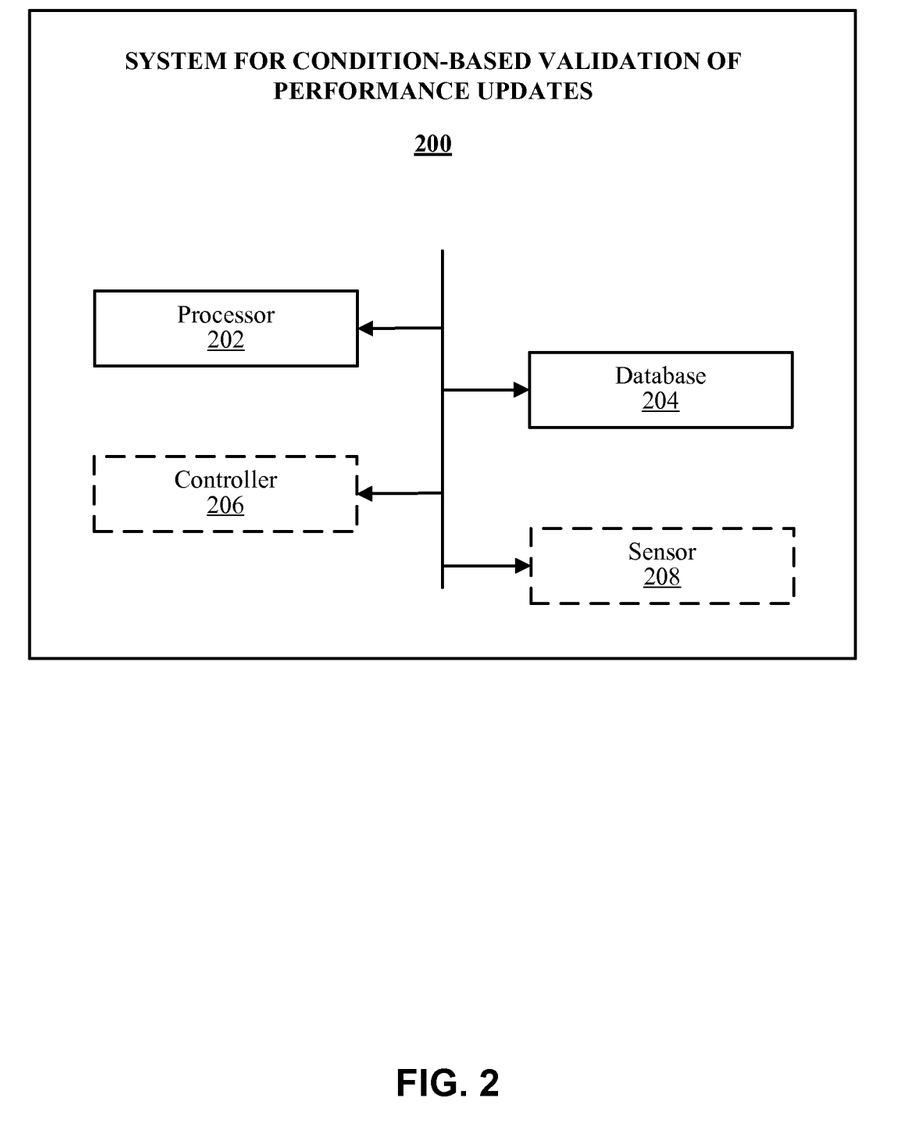
FIG. 2 is a block diagram showing various modules of an example system for condition-based validation of performance updates, in accordance with certain embodiments of the disclosure.

FIG. 2 is a block diagram showing various modules of the system 200 for condition-based validation of performance updates, in accordance with certain embodiments. The system 200 for condition-based validation of performance updates may include a processor 202, a database 204, and optionally, a controller 206, and a sensor 208. The processor 202 may include a programmable processor, such as a microcontroller, central processing unit, and so forth. In other embodiments, the processor 202 may include an application-specific integrated circuit or programmable logic array, such as a field programmable gate array, designed to implement the functions performed by the system 200 for condition-based validation of performance updates.

In various embodiments, the system 200 for condition-based validation of performance updates may be deployed on the controller 206 which is operable to control operation of the asset (e.g., wind turbine). Alternatively, the system 200 for condition-based validation of performance updates can reside outside the controller 206 and be provided remotely.

The sensor 208 can be configured to sense data of the asset, for example, related to the performance of the asset. The processor 202 can operate an asset under updated settings according to the update or upgrade associated with the asset. Additionally, the processor 202 can ascertain ambient conditions of the asset. The ambient conditions can include the conditions of an environment in which the asset is operated. The processor 202 can match the ambient conditions to a condition range. The condition range can correspond to a certain combination of ambient conditions. For example, an example condition range can include wind speed of about 7 meters per second and air density of about 1.08 kilogram per cubic meter. When the ambient conditions include wind speed of about 7.1 meters per second and air density of about 1.08 kilogram per cubic meter, the processor can match the ambient conditions to this condition range.

Furthermore, the processor 202 can determine whether data completion criteria for the condition range are satisfied. If the data completion criteria are satisfied, the processor 202 can consider data collection for the condition range completed and continue operation of the asset under updated settings for a predetermined period of time (e.g., 10 minutes). If the data completion criteria are not satisfied, the processor 202 can determine that data collection for the condition range should continue and switch the asset to the baseline settings for a predetermined period of time. After expiration of the predetermined period of time, the procedure can be repeated until the data completion criteria are satisfied for all condition ranges in the data matrix. Based at least in part on the data in the data matrix, the processor can calculate the performance increase (if any) associated with the update. The database 204 can be configured to store the data for the baseline and updated conditions, condition ranges, validation results, calculated performance increases, and so forth.

Figure 3:
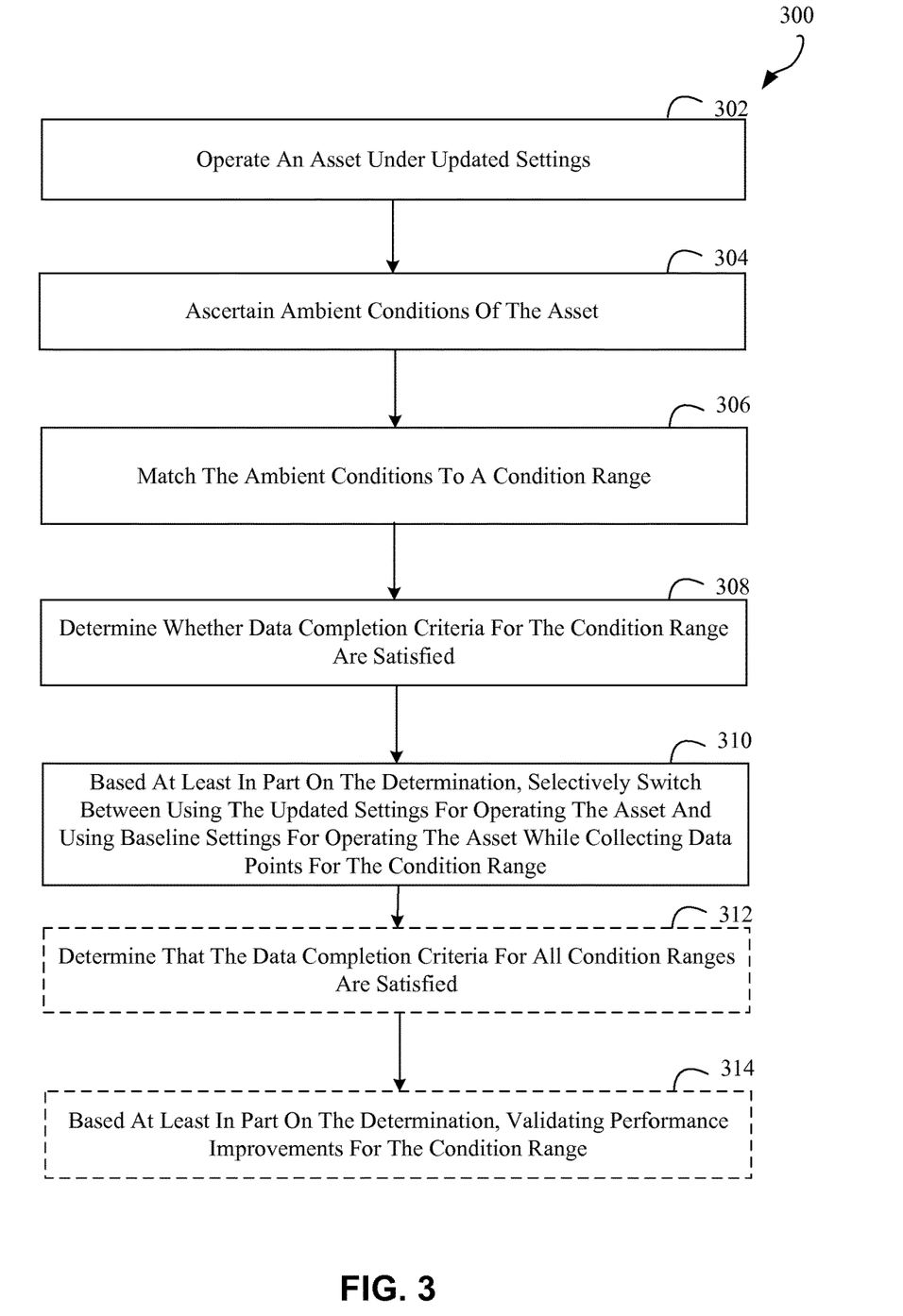
FIG. 3 is a process flow diagram illustrating an example method for condition-based validation of performance updates, in accordance with certain embodiments of the disclosure.

FIG. 3 is a process flow diagram illustrating a method 300 for condition-based validation of performance updates, in accordance with an embodiment of the disclosure. The method 300 can be performed by processing logic that may include hardware (e.g., dedicated logic, programmable logic, and microcode), software (such as software run on a general-purpose computer system or a dedicated machine), or a combination of both. In one example embodiment of the disclosure, the processing logic resides at the processor 202 that can be part of a controller 900 described below with reference to FIG. 9, which can, in turn, reside on a remote device or a server. The processor 202 can include processing logic. It will be appreciated by one of ordinary skill in the art that instructions said to be executed by the controller 900 may, in fact, be retrieved and executed by one or more processors. The controller 900 can also include memory cards, servers, and/or computer disks. Although the controller 900 may be configured to perform one or more steps described herein, other control units can be utilized while still falling within the scope of various embodiments of the disclosure.

As shown in FIG. 3, the method 300 may commence at operation 302 with operating an asset under updated settings. The asset, for example, a turbine or a wind turbine, can be operated under updated settings designed to boost up power production performance of the asset. To confirm and estimate the performance increase gained by the updated settings, the asset can be switched back to baseline settings and forth to the updated settings after similar time intervals (for example, increments of 10 minutes). The switching interval can be configurable by a user or automatically. Data concerning asset performance under baseline and updated settings can be collected for various combinations of ambient conditions expected for the asset. Ambient conditions can be ascertained at operation 304.

At operation 306, ambient conditions (e.g., a wind speed, a wind direction, and an air density) can be matched to a condition range. The condition range can be represented by a data bin associated with specific condition values (with some deviations) in a data matrix including all data to be collected for performance validation as illustrated by FIGS. 5-8. Thus, the system 200 for condition-based validation of performance updates can determine that values of ascertained ambient conditions fall within the range of conditions associated with a specific data bin.

To avoid switching to baseline conditions when the baseline conditions are not needed for data collection, the system 200 for condition-based validation of performance updates can allow defining data completion criteria for the condition ranges. The data completion criteria can include a predetermined minimum number of data points for the condition range. For example, it can be predetermined that the minimum number of data points for a condition range is fifty. Thus, the data collection for this condition range can continue until the minimum number of data points is reached. When the minimum number of data points is reached, the data for such condition range and ambient conditions is no longer collected, and the asset operates under the updated settings until the ambient conditions change. Furthermore, the data completion criteria can include statistical analysis of data points. Partial data can be collected for a subset of data points. The system 200 for condition-based validation of performance updates can determine an average and a standard deviation of the partial data. The deviation can be divided by a square root of the number of data points to determine uncertainty. When the uncertainty for the condition range reaches a predetermined uncertainty threshold, data collection for that condition range can stop.

Additionally, the data completion criteria can consider frequency distribution of the condition range. For example, a wind speed of about 50 meters per second (m/s) in a hot weather is highly unlikely. Such a weather condition can happen rarely or not at all. Therefore, data points associated with such condition range may not be insignificant for performance validation. To represent a frequency distribution of the condition ranges in the data matrix, a weight can be calculated and assigned to each condition range in the matrix. Based at least in part on the weights of the condition ranges, data completion of the data matrix can be identified. For example, if about 70% of the data points is received and those data points represent about 98% of the power generation in the data matrix, the data completion criteria associated with the frequency distribution can be considered satisfied.

At operation 308, it can be determined whether data completion criteria for the condition range which matches the ambient conditions are satisfied. At operation 310, the asset can be selectively switched between using the updated settings for operating the asset and using baseline settings for operating the asset while collecting data points for a predetermined period of time. If the data completion criteria are satisfied, the data collected for the condition range in view can be considered sufficient to determine asset performance. In this case, no further data for the condition range is collected and the asset is no longer toggled to the baseline settings. If a decision is made not to toggle to the baseline conditions, the decision can be revisited at the start of the next predetermined period.

Furthermore, at an optional operation 312, the system 200 for condition-based validation of performance can determine that the data completion criteria for all condition ranges in the data matrix are satisfied. The data completion criteria for the data matrix can include statistical criteria, frequency distribution, and so forth. If the data completion criteria for the data matrix are satisfied, performance improvements associated with the update can be validated at operation 314. Additionally, a value representing a performance improvement (for example, a percentage of the increase in the power generation) can be calculated based at least in part on the data points and provided, for example, to an operator of the asset via a user interface associated with the asset.

Figure 4:
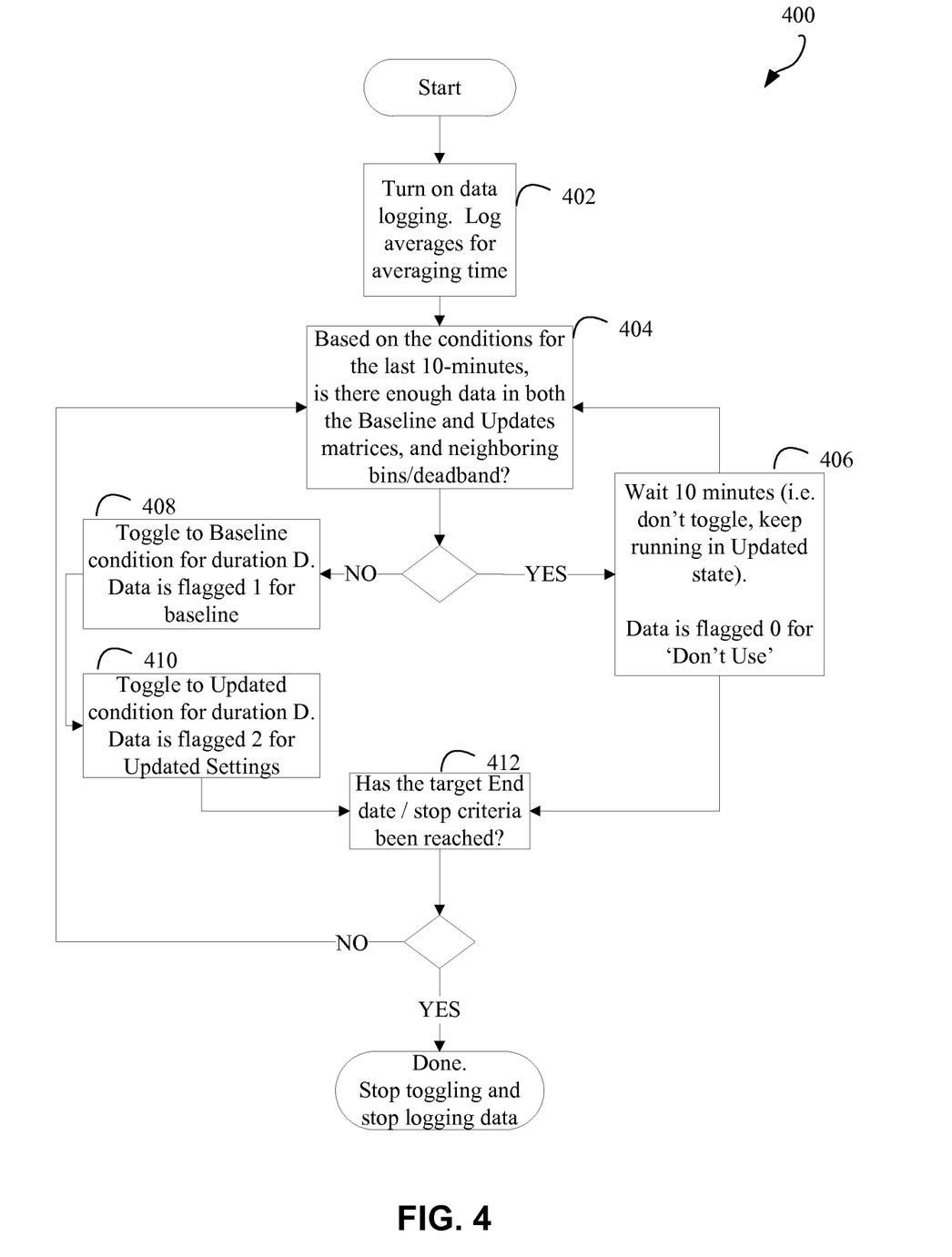
FIG. 4 is a process flow diagram illustrating an example method for condition-based validation of performance updates, in accordance with certain embodiments of the disclosure.

FIG. 4 depicts a process flow diagram illustrating a method 400 for condition-based at least in part on validation of performance updates, in accordance with an embodiment of the disclosure. The method 400 can commence at operation 402 with turning on data logging. Logged data can include one or more parameters of the asset. Average data values can be logged for an average time. The average time can be configurable, for example, it can be set to 30-second averages, 1-minute, 10-minute, and so forth. At operation 404, conditions within the previous predetermined period (e.g. last 10 minutes) can be analyzed to determine if there is sufficient data in a baseline and validation matrices and neighboring bins. If there is sufficient data, the asset is operated under updated conditions for another predetermined period at operation 406. The data for that period is flagged as 0 and is not used for validation.

If the data is not sufficient, the asset is toggled to baseline settings for the predetermined period at operation 408. Data logged during the predetermined period is flagged as 1 to mark the data as associated with baseline conditions. At operation 410, the asset can be toggled to the updated settings for the predetermined period. Data for the updated settings is flagged as 2. Data logging can continue until, at operation 412, it is determined that a target date (the end date of performance validation period) is reached or until the data completion criteria are satisfied. If the target date is not reached and the data completion criteria are not satisfied, the method 400 can continue at operation 404. At the start of another interval, the controller analyzes the data for the previous period, applies a deviation, for example, about +/−3 m/s, and if any bins with that dead-band are not full, the asset is toggled to baseline conditions. Otherwise, no toggling occurs. For example, if the present wind speed is about 5.5 m/s, the system 200 checks if any bins between about 2.5 and about 8.5 m/s are not completed. If all bins are completed, the asset is operated under the updated settings.

When the target date is reached or the data completion criteria are satisfied, the method 400 completes and data logging stops. The asset can now operate under the updated settings without any toggling. The collected data can be analyzed to validate performance improvements and/or calculate the improvement value.

Figure 5:
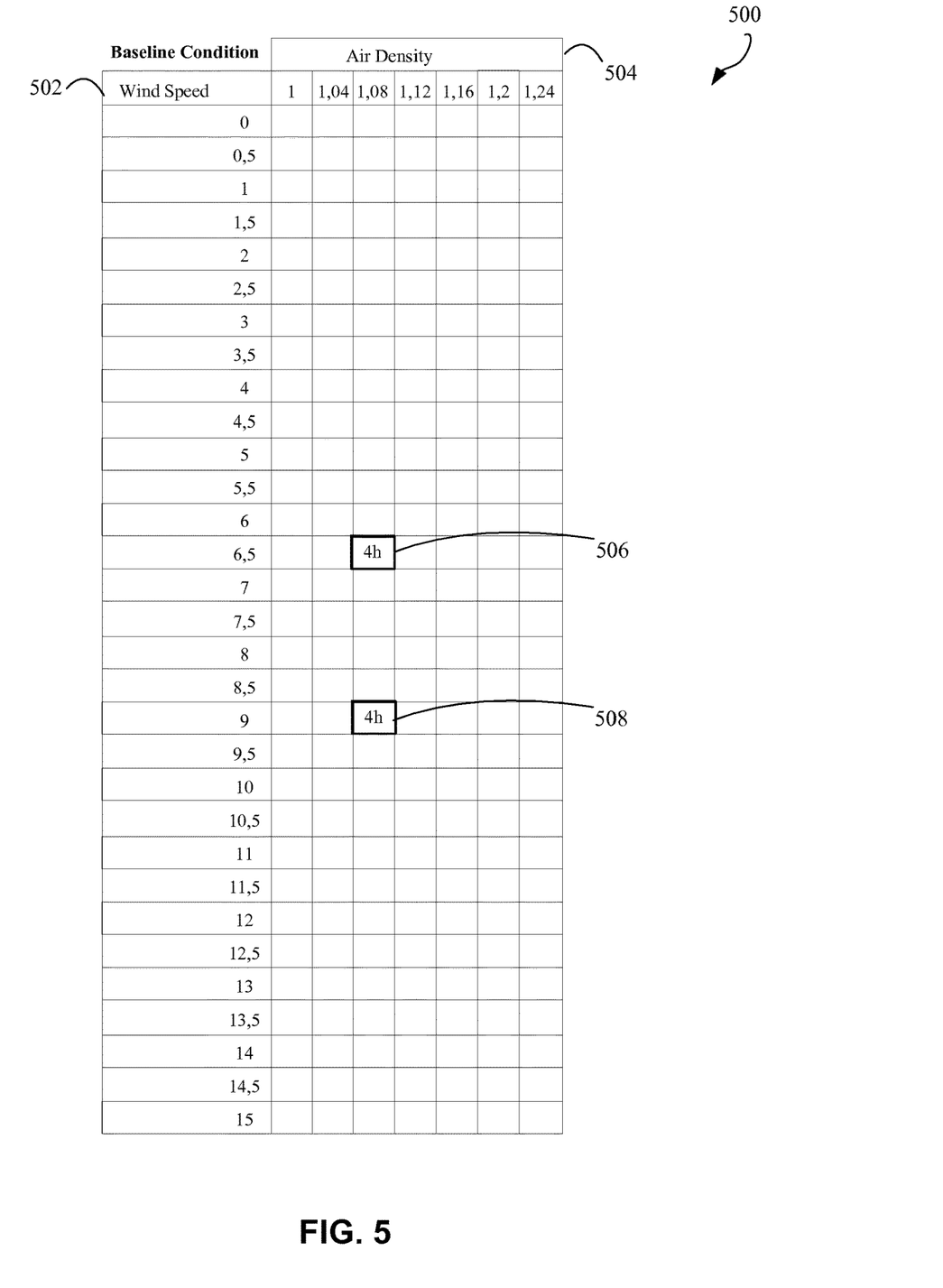
FIG. 5 illustrates an example data matrix for baseline settings, in accordance with certain embodiments of the disclosure.

FIG. 5 is a graph representing a data matrix 500 for baseline settings, in accordance with one or more example embodiments of the disclosure. A combination of wind speed 502 and air density 504 conditions can constitute a condition range corresponding to a data bin. In other embodiments, other ambient conditions can be used in a matrix. The data matrix 500 can be completed with data received from the asset operated under baseline settings. Bins 506 and 508 can have 4 hours of data logged under the baseline settings.

Figure 6:
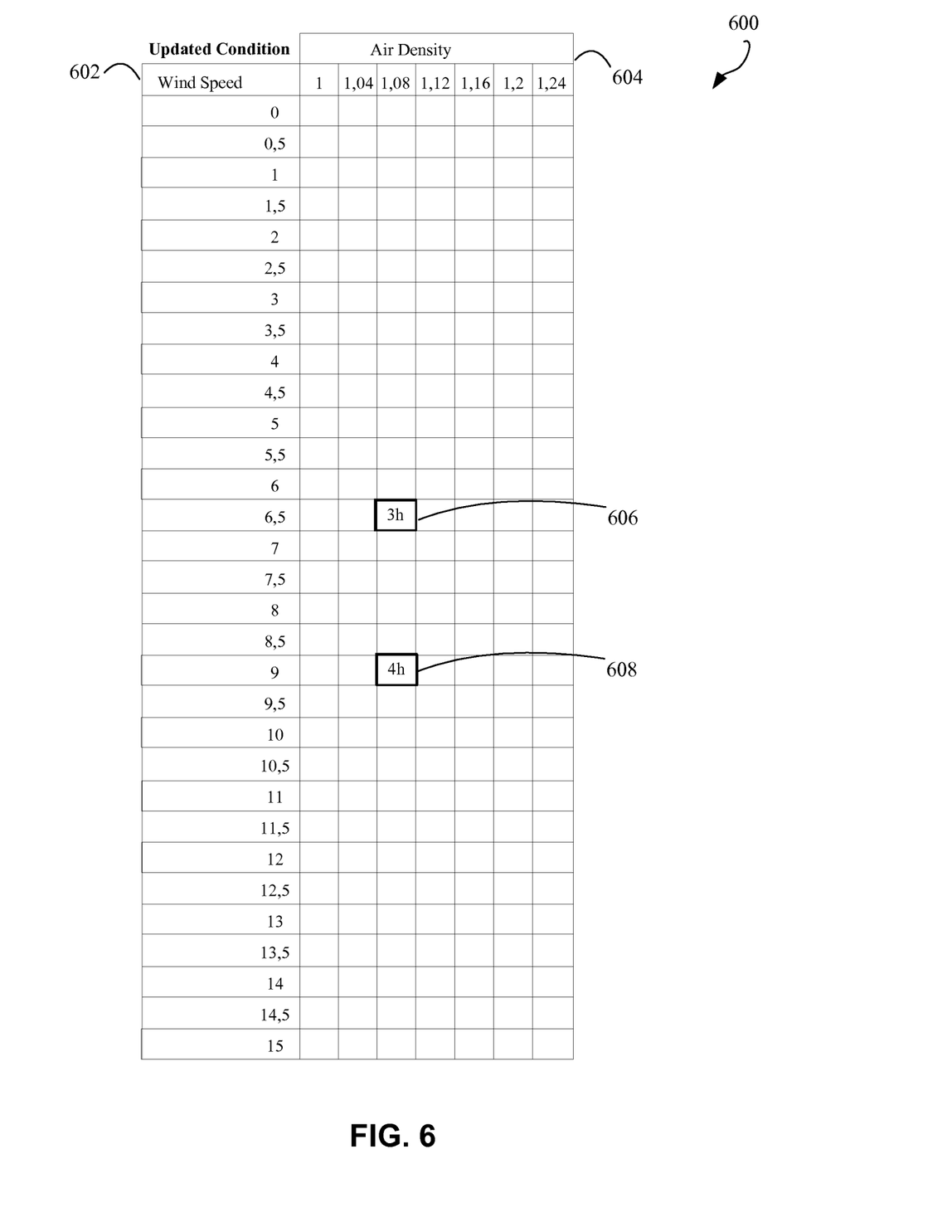
FIG. 6 illustrates an example data matrix for updated settings, in accordance with certain embodiments of the disclosure.

FIG. 6 is a graph representing a data matrix 600 for updated settings, in accordance with one or more example embodiments of the disclosure. The data matrix 500 is completed with data received from the asset operated under the updated settings. As illustrated, bin 606 associated with wind speed 602 of about 6.5 m/s and air density 604 of about 1.08 kilogram per cubic meter (kg/m3) can have 3 hours of data logged under the updated settings, while bin 608 (about 9 m/s and about 1.08 kg/m3) can have 4 hours of data.

For each data bin, at least one data completion criterion can be determined. It can be determined statistically. Since some of the bins are associated with rarely occurring conditions, the number of data points collected for such bins can be smaller than for the bins associated with frequent ambient conditions. For example, to obtain about 5 kilowatt (KW) accuracy with a standard deviation of the data about 25 KW, the number of data points N can be calculated as follows: $N=(4.167)^2=25$ data points=4 hours of data in that bin.

Figure 7:
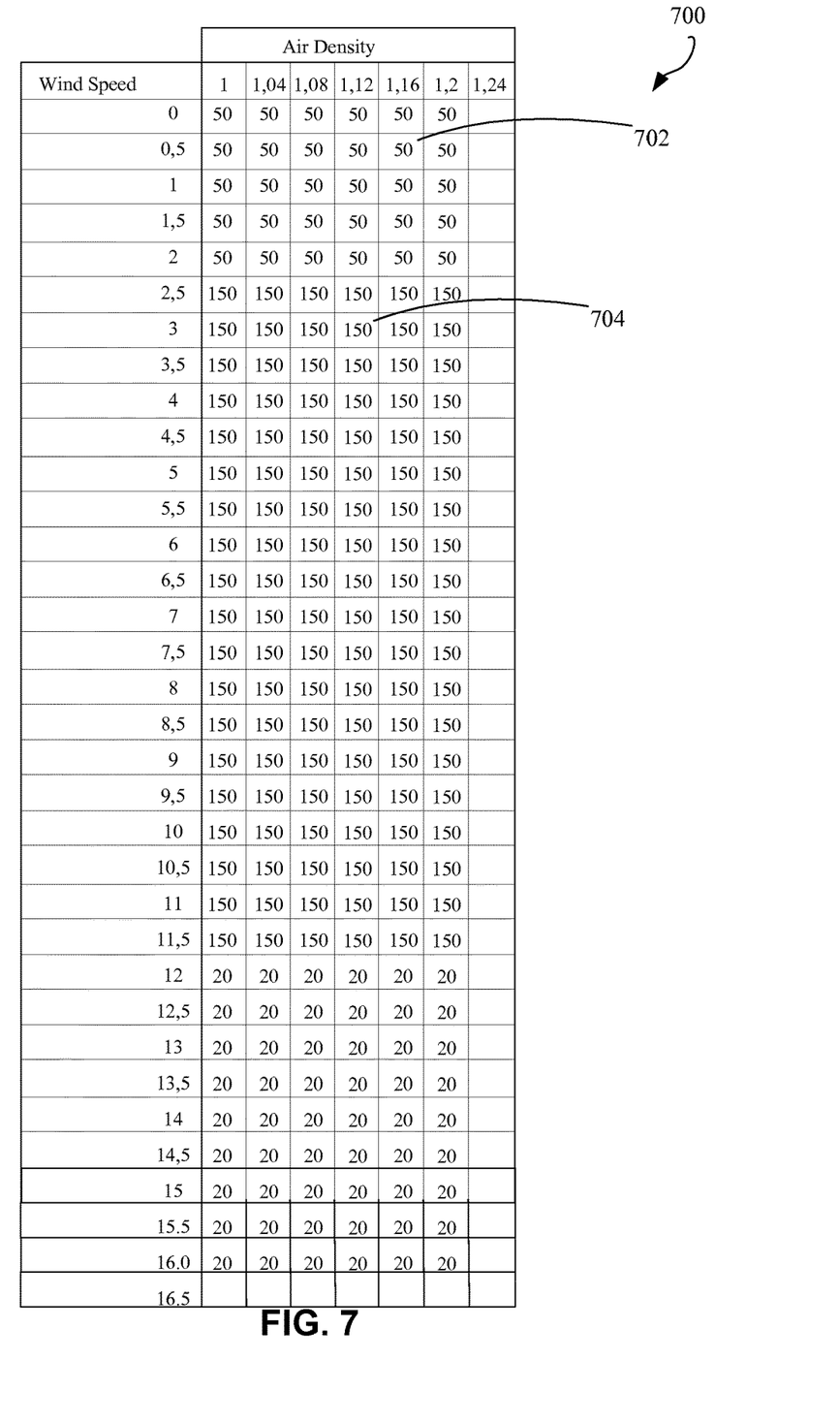
FIG. 7 illustrates an example data matrix with a minimum number of data points assigned to bins, in accordance with certain embodiments of the disclosure.

FIG. 7 is a graph representing a data matrix 700, in accordance with one or more example embodiments of the disclosure. Each bin of the data matrix 700 is associated with a minimum number of data point to be collected for that bin. As illustrated, a minimum number of data points for bin 702 is 50, while a minimum number of data points for bin 704 is 150.

Figure 8:
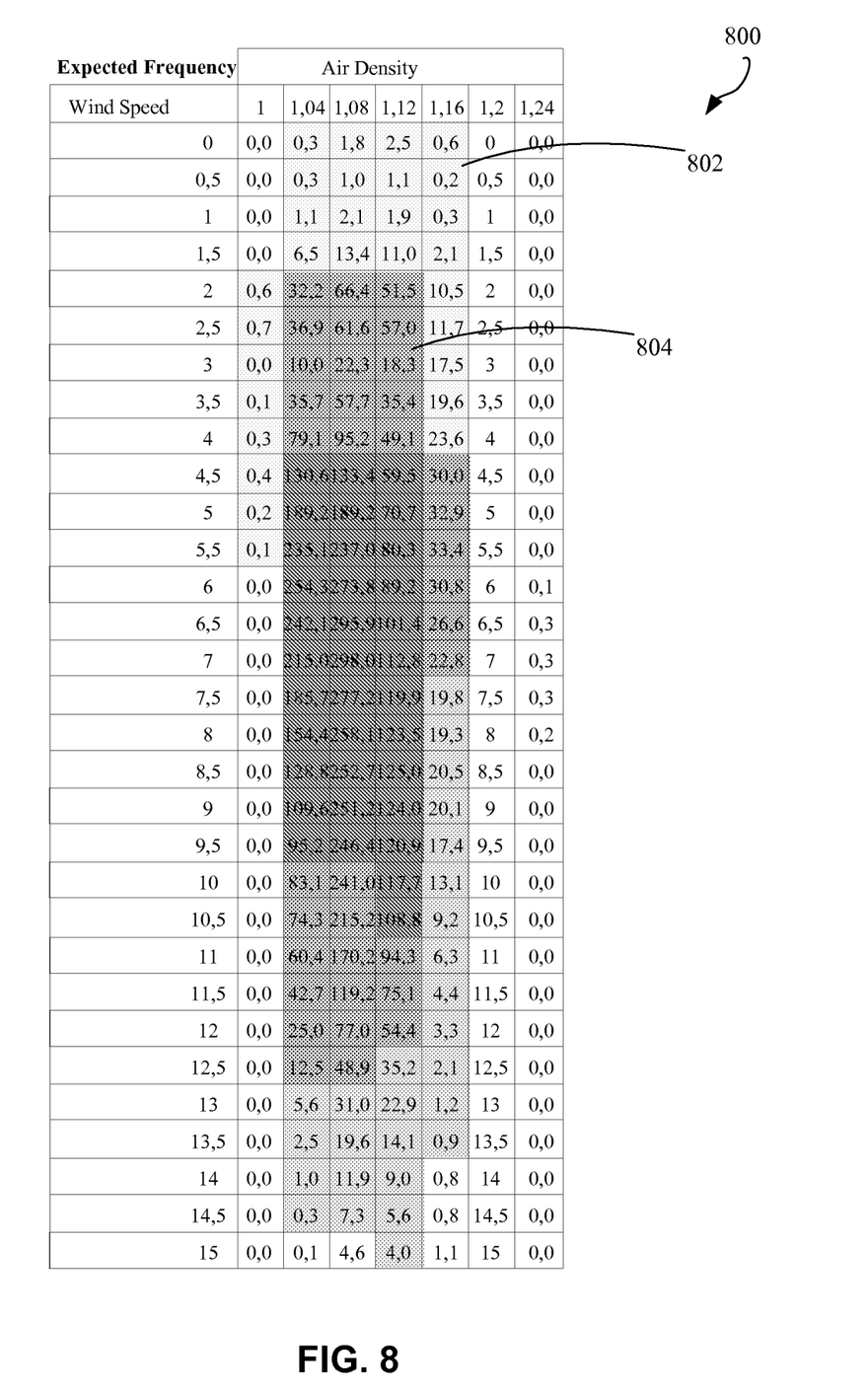
FIG. 8 is an example data matrix with weights assigned to each bin based on a frequency distribution, in accordance with certain embodiments of the disclosure.

Furthermore, a data completion criteria based at least in part on frequency distribution can be determined for a data matrix. FIG. 8 shows a data matrix 800 with weights assigned to each bin based at least in part on a frequency distribution. Bin 802 is assigned a weight of about 0.2, while bin 804 is assigned a weight of about 18.3. The weights correspond to an expected frequency of the condition ranges for the asset. The weights can be used to estimate how much the missing data in a specific bin is worth (incomplete/missing bins). The performance validation can be stopped once the missing data value reaches a predetermined threshold. For example, the missing data can only represents about 10% of the expected running conditions. Alternatively, an uncertainty can be applied to the estimated result. If the system 200 assumes about 0% gain for about 10% of missing data and the calculated gain is about 4.8% for the other about 90% of the data, it can be determined that the lower limit for the total gain is 0.9*4.8%=4.3%.

Figure 9:
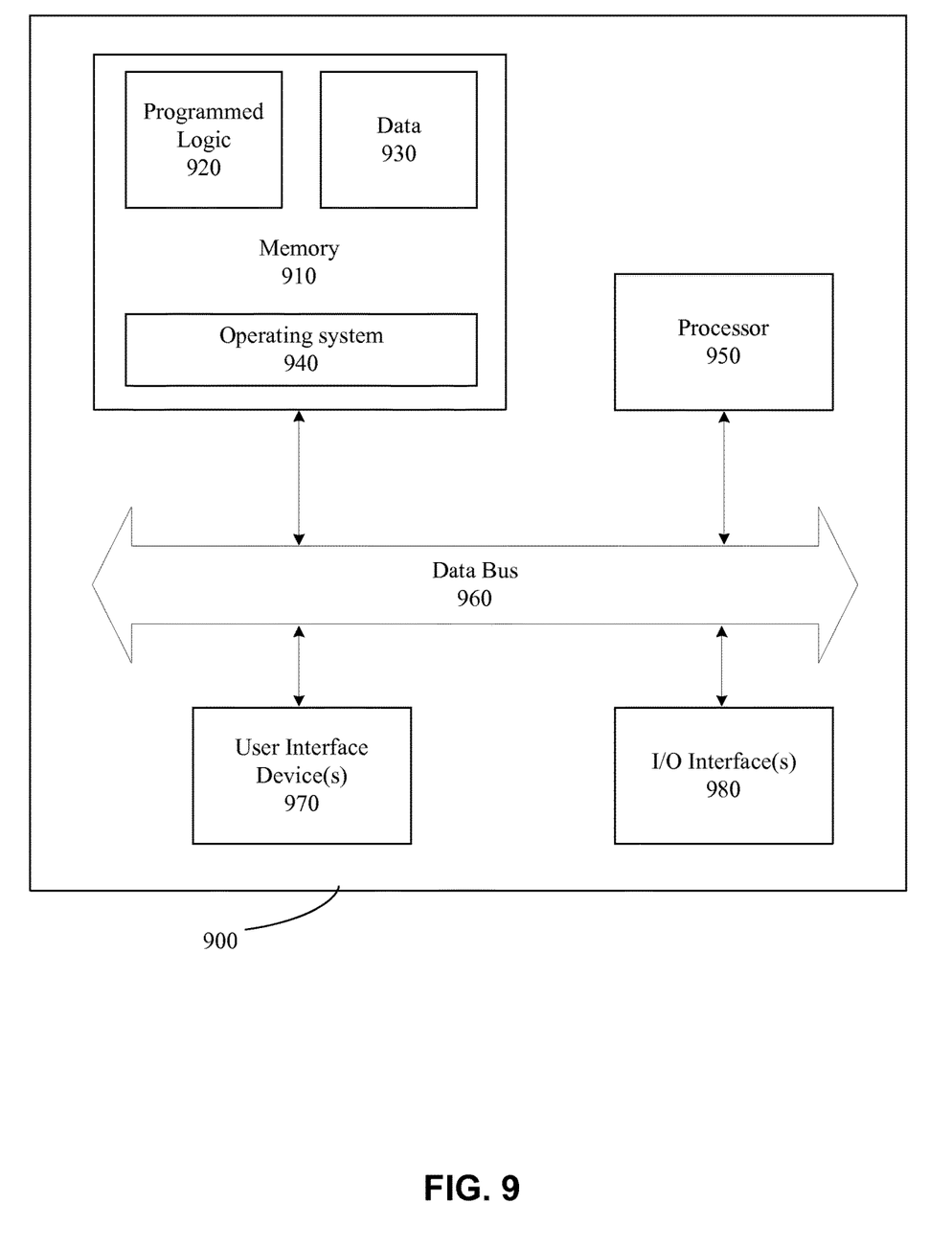
FIG. 9 is a block diagram illustrating an example controller where the system for condition-based validation of performance updates can reside, in accordance with certain embodiments of the disclosure.

FIG. 9 depicts a block diagram illustrating an example controller 900 where the system 200 for condition-based validation of performance updates can reside, in accordance with an embodiment of the disclosure. More specifically, the elements of the controller 900 may be used to validate performance update based at least in part on data completion conditions. The controller 900 may include a memory 910 that stores programmed logic 920 (e.g., software) and may store data 930, such as ambient conditions of an environment in which a turbine is to be operated, data indicative of the turbine performance under baseline and updated settings, and the like. The memory 910 also may include an operating system 940.

A processor 950 may utilize the operating system 940 to execute the programmed logic 920, and in doing so, may also utilize the data 930. A data bus 960 may provide communication between the memory 910 and the processor 950. Users may interface with the controller 900 via at least one user interface device 970, such as a keyboard, mouse, control panel, or any other devices capable of communicating data to and from the controller 900. The controller 900 may be in communication with the turbine online while operating, as well as in communication with the turbine offline while not operating, via an input/output (I/O) interface 980. More specifically, one or more of the controllers 900 may include at least one performance update including one or more updated settings. The controllers 900 can carry out condition-based validation of performance updates, such as, but not limited to, operate the turbine under the one or more updated settings, ascertain ambient conditions of the turbine, match the ambient conditions to a condition range, determine whether data completion criteria for the condition range are satisfied, and based at least in part on the determination, selectively switch between using the updated settings for operating the asset and using baseline settings for operating the asset while collecting data points for a predetermined period of time. Additionally, it should be appreciated that other external devices or multiple other power plants may be in communication with the controller 900 via the I/O interface 980. In the illustrated embodiment of the disclosure, the controller 900 may be located remotely with respect to the turbine; however, it may be co-located or even integrated with the turbine. Furthermore, the controller 900 and the programmed logic 920 implemented thereby may include software, hardware, firmware, or any combination thereof. It should also be appreciated that multiple controllers 900 may be used, whereby different features described herein may be executed on one or more different controllers 900.

Accordingly, certain embodiments of the disclosure described herein can allow for streamline performance validation and accurate calculation of the performance increase value, while maximizing benefit of the updated settings during the validation period.

References are made to block diagrams of systems, methods, apparatuses, and computer program products according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments of the disclosure disclosed and that modifications and other embodiments of the disclosure are intended to be included within the scope of the appended claims. Although specific terms are employed herein, they are used in a generic and descriptive sense only and not for purposes of limitation.

What is claimed is:

1. A method for condition-based validation of performance updates of an asset, comprising:
    operating, by a processor, the asset under updated settings;
    ascertaining, by a processor, ambient conditions of the asset;
    matching, by a processor, the ambient conditions to a condition range in a data matrix, the condition range comprising one or more combinations of the ambient conditions;
    determining, by a processor, whether data completion criteria for the condition range are satisfied, the data completion criteria comprising a predetermined minimum number of data points that equal the one or more combinations of the ambient conditions; and
    based at least in part on the determination, selectively switching, by a processor, between using the updated settings for operating the asset and using baseline settings for operating the asset while collecting data points for a predetermined period of time.

2. The method of claim 1, further comprising:
    determining, by a processor, that the data completion criteria for all condition ranges are satisfied;
    based at least in part on the determination, validating, by a processor, performance improvements; and
    calculating a percentage of the performance improvements based at least in part on the data points.

3. The method of claim 2, wherein the validating includes comparing power output of the asset under the baseline settings and the updated settings.

4. The method of claim 3, wherein the asset comprises a turbine or a wind turbine.

5. The method of claim 1, wherein the ambient conditions include at least one of the following: a wind speed, a wind direction, a wind shear, an air density, an air temperature, an air humidity, an air pressure, a Bulk Richardson Number, a turbulence intensity, a wind veer, a time of day, a season, and a metric quantifying Atmospheric Stability.

6. The method of claim 1, wherein the determining whether data completion criteria for the condition are satisfied comprises performing statistical analysis on the data points.

7. The method of claim 6, wherein the statistical analysis includes:
    collecting, by a processor, partial data for a subset of the data points;
    determining, by a processor, an average and a deviation of the partial data;
    determining, by a processor, an uncertainty by dividing the deviation by a square root of the predetermined minimum number of data points; and
    determining, by a processor, whether the uncertainty exceeds a predetermined uncertainty threshold.

8. The method of claim 1, wherein the data completion criteria for the condition range are based at least in part on a frequency distribution of the condition range.

9. The method of claim 8, wherein the data completion criteria are calculated by assigning a weight to the condition range based at least in part on the frequency distribution of the condition range.

10. A system for condition-based validation of performance updates of an asset, comprising:
    a processor configured to:
        operate the asset under updated settings;
        ascertain ambient conditions of the asset;
        match the ambient conditions to a condition range in a data matrix, the condition range comprising one or more combinations of the ambient conditions;
        determine whether data completion criteria for the condition range are satisfied, the data completion criteria comprising a predetermined minimum number of data points that equal the one or more combinations of the ambient conditions; and based at least in part on the determination, selectively switch between using the updated settings for operating the asset and using baseline settings for operating the asset while collecting data points for a predetermined period of time; and a database in communication with the processor, the database being configured to store the data points for the condition range.

11. The system of claim 10, wherein the processor is further configured to: determine that the data completion criteria for the condition range are satisfied; and based at least in part on the determination, continue the operation of the asset under the updated settings.

12. The system of claim 10, further comprising at least one sensor configured to sense at least one parameter associated with the data points for the predetermined period of time, wherein the at least one parameter includes a power output.

13. The system of claim 12, wherein the processor is further configured to:

compare the power output of the asset under the baseline settings and the updated settings; and based at least in part on the comparing, validate the performance updates.

14. The system of claim 10, wherein the asset comprises a turbine or a wind turbine.

15. The system of claim 10, wherein the data completion criteria include one or more of the following: a predetermined minimum number of data points for the condition range and performing statistical analysis on the data points.

16. The system of claim 10, wherein the data completion criteria are calculated by assigning a weight to the condition range based at least in part on a frequency distribution of the condition range.

17. The system of claim 16, wherein processor is further configured to, based at least in part on the calculation, determine that the data completion criteria are satisfied if a threshold percentage of all condition ranges is reached.

18. A power generation system comprising:

a turbine;

a controller in communication with the turbine, wherein the controller includes at least one performance update comprising one or more updated settings;

a processor in communication with the controller and configured to:

operate the turbine under the one or more updated settings;

ascertain ambient conditions of the turbine;

match the ambient conditions to a condition range in a data matrix, the condition range comprising one or more combinations of the ambient conditions;

determine whether data completion criteria for the condition range are satisfied, the data completion criteria comprising a predetermined minimum number of data points that equal the one or more combinations of the ambient conditions;

based at least in part on the determination, selectively switch between using the updated settings for operating the asset and using baseline settings for operating the asset while collecting data points for a predetermined period of time;

determine that the data completion criteria for the condition range are satisfied; and based at least in part on the determination, validate performance improvements for the condition range; and a database in communication with the processor, the database configured to store the data points for the condition range.

* * * * *